(No Model.)
R. NIEDERGESAESS.
CONVEYER BELT.
No. 507,156. Patented Oct. 24, 1893.
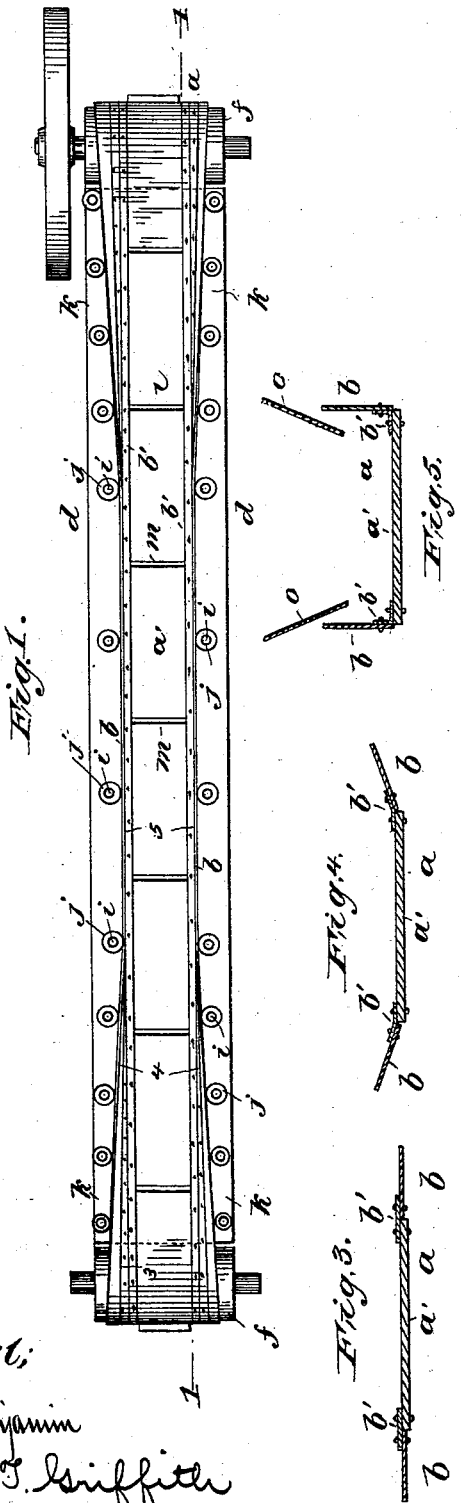
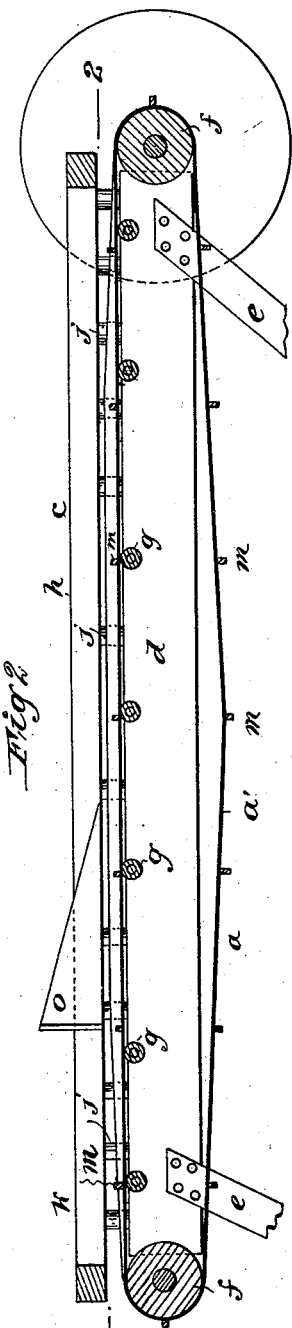
Inventor:
Robert Niedergesaess
Attest:
C. W. Benjamin
Percy T. Griffith

UNITED STATES PATENT OFFICE.

ROBERT NIEDERGESAESS, OF SEATTLE, WASHINGTON.

CONVEYER-BELT.

SPECIFICATION forming part of Letters Patent No. 507,156, dated October 24, 1893.

Application filed March 24, 1892. Serial No. 426,205. (No model.)

*To all whom it may concern:*

Be it known that I, ROBERT NIEDERGESAESS, a subject of the Queen of Great Britain, residing at Seattle, in the county of King and State of Washington, have invented a certain new and useful Improvement in Conveyer-Belts, of which the following is a specification.

This invention relates to conveyer belts for transferring grain, ore and other materials and has special reference to conveyer belts to be used in brick machines.

The object of the invention is to provide conveyer belts which will automatically become trough shaped along the upper part of the belt or that portion of the belt conveying the material to be transferred and will automatically return to a flat position upon reaching the drum or roller which actuates the belt at the discharging end of the latter, thereby enabling a flat belt to pass smoothly over the actuating drums or rollers and also to serve as a trough in conveying the material while being transferred.

The invention consists in a conveyer belt and its accessories, constructed and arranged as hereinafter described and claimed.

In the accompanying drawings in which similar letters of reference refer to like parts, Figure 1 is a plan view of a conveyer belt and frame-work constructed in accordance with my invention in horizontal section on the line 2 2 of Fig. 2. Fig. 2 is a longitudinal vertical section thereof taken on the line 1 1, Fig. 1. Fig. 3 is a detail view of the belt in transverse section, showing the position of its edges when not formed or forming itself into the shape of a trough. Fig. 4 is a detail view of the belt in transverse section, showing position of its edges when either assuming or departing from the trough shape. Fig. 5 is a detail view of the belt in transverse section and a hopper above it, showing the edges of the belt in vertical position when it has assumed the trough shape.

To illustrate the manner of carrying out my invention I have shown and will describe one form thereof.

In this construction $a$ indicates the conveyer belt formed in three parts, consisting of the central or main portion $a'$ and the side portions or edges $b$, of any suitable material, the side portions $b$, being connected to the main portion $a$, by strips or pieces $b'$, which serve as hinges to permit the side portions $b$, to be forced up to a vertical position and which in this case are elastic, so as to hold the side portions $b$ in horizontal position when the belt is not serving as a trough, and to throw the side portions $b$ into horizontal position when released from the vertical position.

In order that the portion of the belt conveying the material to be transferred may be formed into a trough shape, suitable devices are employed mounted on a frame extending along the edges of the belt. In the example shown I employ a frame $c$, composed of two longitudinal beams $d$, extending along the edges of the belt $a$, and supported by legs $e$. At the ends of the frame $c$, are mounted the drums or rollers $f$, over which extends the belt $a$, driven thereby. The belt $a$, rests on rollers $g$, mounted on and extending between the beams $d$. Extending longitudinally therewith and above the beams $d$, are strips $h$, supported on the beams $d$, by means of pins $i$, on which are mounted rollers $j$, which serve as guide and friction rollers to hold the side portions $b$, of the belt $a$, in vertical position to form a trough, except toward the ends of the beams $d$, where they serve at the end, where the material to be conveyed is delivered, to raise the side portions $b$, of the belt $a$, gradually into a vertical position, as shown in Fig. 4, to form a trough as in Fig. 5; or to gradually release the side portions $b$, and permit them to assume the horizontal position at the delivery end of the belt. It will be noticed that the end portions $k$, of the beams $d$, are formed of an outwardly tapering or flaring shape so that the rollers $j$, located thereon will permit the side portions $b$, of the belt to be gradually raised from the horizontal to the vertical position at the receiving end of the belt, and to be gradually lowered from the vertical to the horizontal position at the delivery end of the belt. It will thus be seen that by the means just described, the rollers $j$ arranged in an outwardly diverging direction at the receiving end of the belt, gradually force the sides $b$ of the belt to a vertical position as the belt travels onward, and that the rollers $j$, along the central upper portion of the belt hold up the adjacent sides $b$, of the belt, thereby forming a trough, while the rollers $j$ arranged in an outwardly diverging direction adjacent to the delivery end of the belt permit the sides $b$, of the belt to be gradually drawn down to a horizontal position before reaching the driving drum, thereby causing the belt to pass over the latter in a flat position.

In lieu of friction guide rollers constructed and arranged as just described, other suitable devices may be employed to raise, hold up, and lower the sides of the portion of the belt serving as a trough between the driving rollers; as for example, pins may be used instead of the friction rollers $j$, or continuous guides with oblique ends may be employed.

In order that certain desired quantities of material may be transferred by the conveyer belt, I preferably employ cleats $m$, which extend across the central portion of the belt to the partly folded side portions.

$o$ indicates a feed hopper mounted on the strips $h$ above the belt $a$.

It will be seen from the foregoing description that a flat conveyer belt may be utilized so that the portion of the belt conveying the material to be transferred, may easily and simply be automatically changed to the shape of a trough, and the belt readily pass over the driving drums as a flat belt.

I do not limit myself to the particular construction of the invention herein set forth, as it may be modified in various ways. By utilizing a flat belt with an automatically formed trough as herein set forth, waste and clogging of material are avoided and all kinds of solid or loose material may be conveyed.

Having described my invention, what I claim is—

1. In a conveying apparatus, the combination with a conveyer belt and driving drums over which the said belt is carried, of a series of vertical guides placed parallel to the opposite edges of the said belt, and converging and diverging series of vertical guides at the ends of said series of parallel guides.

2. In a conveying apparatus, the combination with a conveyer belt, and driving drums over which the said belt is carried, the said conveyer belt being provided at intervals with cleats, of a series of vertical guides placed parallel to the opposite edges of said belt, and converging and diverging series of vertical guides at the ends of the said series of parallel vertical guides, substantially as set forth.

3. In a conveying apparatus, the combination of a conveyer belt and driving drums by which the said belt is carried, of the beams or frames $d$ placed at the sides of the said belt, a series of vertical rollers on each side of said belt and arranged parallel to the latter and to each other, and converging and diverging series of vertical rollers at the ends of said series of parallel vertical rollers; whereby the said converging rollers will gradually cause the ends of said belt to assume an upright position, the series of parallel rollers will hold the said edges in upright positions, while the diverging series of rollers will permit the edges of the belt to gradually assume a horizontal position.

4. A conveyer belt consisting of body and side portions of stiff material, and elastic connections between the said body and side portions, said elastic connections causing the said side portions normally to lie in the same horizontal plane with the body of the belt but permitting them to be turned up when desired.

5. A conveyer belt consisting of body and side portions of stiff material, flexible and elastic connections between the said body and side portions, said connections permitting the said side portions to be turned up when desired and causing them to assume a normal horizontal or flat position, and a series of cleats attached to the said body portion of the belt.

In testimony whereof I have affixed my signature in presence of two witnesses.

ROBERT NIEDERGESAESS.

Attest:
W. A. PETERS,
SIDNEY M. VAN WYCK, Jr.